(12) United States Patent
Nosley et al.

(10) Patent No.: US 8,305,950 B2
(45) Date of Patent: Nov. 6, 2012

(54) CONTENT SYNCHRONISATION FOR MOBILE COMMUNICATION NETWORK

(75) Inventors: Michael Nosley, Tokyo (JP); Pierre Marchand, Tokyo (JP)

(73) Assignee: NEC Corporation, Tokyo (JP)

( * ) Notice: Subject to any disclaimer, the term of this patent is extended or adjusted under 35 U.S.C. 154(b) by 308 days.

(21) Appl. No.: 12/451,257

(22) PCT Filed: May 2, 2008

(86) PCT No.: PCT/JP2008/058423
§ 371 (c)(1),
(2), (4) Date: Nov. 3, 2009

(87) PCT Pub. No.: WO2008/139976
PCT Pub. Date: Nov. 20, 2008

(65) Prior Publication Data
US 2010/0103923 A1    Apr. 29, 2010

(30) Foreign Application Priority Data
May 4, 2007   (GB) .................................. 0708694.5

(51) Int. Cl.
*H04H 20/71* (2008.01)
*H04L 12/56* (2006.01)
*H04J 3/16* (2006.01)

(52) U.S. Cl. ..................... 370/312; 370/395.1; 370/466

(58) Field of Classification Search .................. None
See application file for complete search history.

(56) References Cited

U.S. PATENT DOCUMENTS

| | | | |
|---|---|---|---|
| 2005/0201378 A1* | 9/2005 | Ludwig et al. | 370/395.1 |
| 2007/0291788 A1* | 12/2007 | Sammour et al. | 370/466 |
| 2008/0101270 A1* | 5/2008 | Kekki et al. | 370/312 |
| 2008/0198763 A1* | 8/2008 | Fischer et al. | 370/254 |
| 2010/0290423 A1* | 11/2010 | Hwang et al. | 370/329 |

OTHER PUBLICATIONS

NTT DoCoMo, Content synchronization scheme with segmentation and concatenation in eNB 3GPP TSG-RAN3 #54 R3-061661, 3GPP, (Nov. 6, 2006), p. 1-5, Riga, Latvia.
IPWireless, LTE MBMS SFN: Super-frame Based Content Synchronisation, 3GPP TSG RAN WG3 #54 R3-061681, 3GPP, (Nov. 6, 2006), p. 1-10, Riga, Latvia.

* cited by examiner

*Primary Examiner* — Clemence Han
(74) *Attorney, Agent, or Firm* — McGinn IP Law Group, PLLC (57) ABSTRACT

A method of forming RLC blocks for contents synchronization within a mobile radio communications network includes providing a control element for each of a plurality of SDUs within each RLC block. Each control element comprises a header element arranged to precede its respective SDU. A network device provides the RLC blocks and such blocks as having such a structure.

15 Claims, 4 Drawing Sheets

CONTENT SYNCHRONISATION FOR MOBILE COMMUNICATION NETWORK

TECHNICAL FIELD

The present invention relates to a method and related network device and data structure for content synchronisation for a mobile radio communication network.

BACKGROUND ART

As an example, when Single Frequency Network (SFN) technology is used for MBMS delivery, the transmission area of a given service intersects with one or several Multi-cell MBMS Synchronisation Areas (MMSAs). Within each MMSA, the signal transporting the service data must be identical between all its transmitting eNodeBs. This requires time synchronisation between the transmitters and a common resource allocation scheme so that transmit opportunities overlap perfectly (within a tolerance). It is also necessary for each transmit opportunity to encode the same block of data, and so achieve content synchronisation. For this purpose, all the eNodeBs in an MMSA receive the service data packets from a single source, the Multi-cell Coordination Entity (MCE), which delivers the packets using a SYNC protocol which may be time stamp based or byte-offset based or otherwise.

Byte level sequence number based content synchronisation is a relative synchronisation method. That is packets are not assigned any specific transmission time via a timestamp, but the method still ensures that any given packet is transmitted simultaneously by all the eNodeBs of an MMSA. The packets are issued by the MCE with a byte offset which effectively locates them precisely within the stream of bytes formed by the sequence of blocks allocated to the MBMS service, a starting time having been defined. The actual placement implied by a byte offset depends on the overhead spend packing earlier packets, but since all eNodeBs pack packets according to the same rules, content synchronisation is maintained.

Normally with this scheme, the byte offset associated with a packet is equal to that associated with the previous packet plus the size of the previous packet. It should be noted that, as with any scheme, the allocated capacity must be slightly larger than the actual volume of data. This means that idle gaps must be managed from time to time within the packet flow, not to be confused with packets which may be missed by any eNodeB.

The MCE might generate idle gaps in the stream of packets if it encounters itself a gap the upstream flow. However, idle gaps are supposed to adjust the data rates of the source to the actual rate of the air-interface. If the MCE is completely unaware of the overhead consumed by eNodeBs (and it is not constant), it cannot ensure that queuing in the eNodeBs will remain stable. In fact resources would be allocated to avoid average queue growth, which means that the quest would tend to run out of data. The synchronisation method would have to handle this situation or avoid it in the first place by managing idle synchronised gaps in good time.

When an eNodeB detects that it has missed one or more packets, although it cannot transmit any of the blocks affected by the loss (as blocks cannot be partially transmitted), it must determine how many blocks to skip and on which byte to resume transmission in order to stay synchronized with the eNodeBs which did not suffer any loss.

While it might seem that the eNodeB knows the size of the gap from the difference in byte offsets associated with the received packets (before and after the loss), it should be appreciated that the size does not include the overhead added by the packing process. The eNodeB therefore needs to compute the overhead that the other eNodeBs will have spent. That is, it must emulate the packing of the missing data. If only a single packet was lost, then there is only one way it could have been packed. But, at this stage, the eNodeB cannot know that and should not assume it. If several packets were missing, only knowing to sum of their sizes is not sufficient as, in general, the overhead varies according to how the packets fit in the blocks.

From 3 gPP proposal Ericsson, Tdoc R2-070573, there is a known suggestion in which the computation of the overhead is trivial: each block devotes a fixed amount of space to the header; the overhead is therefore constant and so is the amount of user data transported.

However, this known proposal exhibits two limitations and disadvantages.

First there is unused header space, except in the extreme case of a maximum of concatenated packets, which is a rare case. Secondly, in reducing the header, in order to reduce wastage, there is an increased risk of coming across a sequence of packets which uses up the header space, causing waste with unusable space in the data part of the block, then either data loss (by dropping the data that might have fitted in the unused space or delay (by packing this data in the following block).

DISCLOSURE OF INVENTION

Technical Problem

The present invention seeks to provide advantages over the known art.

Technical Solution

According to a first aspect of the present invention there is provided a method of forming RLC blocks for content synchronisation within a mobile radio communications network and including the step of providing a control element for each of a plurality of SDUs within the said block, wherein each control element comprises a header element arranged to precede its respective SDU.

As discussed herein, the invention is particularly advantageous insofar as it can allow for a variable number of packets or segments in each block which can therefore assist in achieving optimisation of the overhead.

Yet further, packet-loss can be detected within the network, for example at an eNodeBs, so that synchronised transmission can be resumed subsequent to the missing data.

Preferably, the said header element comprises a prefix for each said SDU.

The header element can include a flag serving to indicate the length of data to which it refers.

In particular, the header element is advantageously mixed with data within the payload of the SDU.

In one particular embodiment, the header element is of fixed size.

Yet further, the length indicator can be included within a RLC header and the method can further include the step of computing idle gaps.

Yet still further, the formation of the header element can be arranged such as to employ final padding with zeros associated with the length indicators.

The method can also include the step of signalling idle gaps by way of dummy packets.

In particular, the method can include the step of mapping the dummy packets into RLC PDUs as dummy SDUs.

According to another aspect of the present invention there is provided a RLC block for content synchronisation within the mobile radio communications network and including a control element for each of a plurality of SDUs within the said block, wherein each control element comprises a header element arranged to proceed its respective SDU.

Preferably, the said header element comprises a prefix for each said SDU.

The header element can include a flag serving to indicate the length of data to which it refers.

In particular, the header element is advantageously mixed with data within the payload of the SDU.

In one particular embodiment, the header element is of fixed size.

Yet further, the length indicator can be included within a RLC header and the method can further include the step of computing idle gaps.

Yet still further, the formation of the header element can be arranged such as to employ final padding with zeros associated with the length indicators.

According to another aspect of the present invention there is provided a mobile radio communications network device for providing RLC blocks for content synchronization within a mobile radio communications network and being arranged for providing a control element for each of a plurality of SDUs within the said block, and such that each control element comprises a header element arranged to proceed its respective SDU.

Preferably, the said header element can again comprise a prefix for each said SDU.

The header element can include a flag serving to indicate the length of data to which it refers.

In particular, the header element is advantageously mixed with data within the payload of the SDU.

In one particular embodiment, the header element is of fixed size.

Yet further, the length indicator can be included within a RLC header and the method can further include the step of computing idle gaps.

Still further, the formation of the header element can be arranged such as to employ final padding with zeros associated with the length indicators.

Preferably, the mobile radio communications network device comprises a multi-cell coordinating entity.

As will therefore be appreciated, the invention proposes a partially new method of building RLC blocks (RLC being the entity dealing with segmentation and concatenation) which allows a variable number of packets and/or segments in each block, thus optimizing the overhead. Advantageously, it still allows eNodeBs detecting packet loss to resume synchronized transmission after the missing data.

With variable overhead, the MCE can experience an additional problem ensuring that the data queues in the eNodeBs never run out or are controlled with idle gaps: the variable overhead could mean that the precise serving rate of the data by the eNodeBs is not known and feedback from the eNodeBs for this purpose has been excluded by 3GPP. However, the present invention advantageously addresses this aspect too.

The invention serves to address such issues, indirectly, by solving the issues with variable overhead outline above.

As will be appreciated and discussed further below, the invention involves a small modification to the byte offset based SYNC protocol and a specific RLC PDU construction method.

In further detail, the RLC prefixes each SDU delivered by SYNC with an element including the length of the SDU. The prefixes are packed with the SDUs in the payload as if they were part of the data and concatenation is implicit and disassembly reads the prefixes iteratively. The prefixes have a fixed size (2 bytes for LTE) and this size is included by the MCE in the SYNC byte offsets.

The offset of the next packet is that of the previous packet but incremented by the actual size of the previous packet plus the size of an RLC SDU prefix, although, as far as the MCE is concerned, this is merely a constant shared by the SYNC and RLC protocols.

Segmentation is also implicit and reassembly is trivial while no RLC PDUs are lost. The unpacking process is reinitialized after lost RLC PDUs from a "prefix offset field" in every RLC header which points to the next usable prefix (further details in the implementation description below).

SYNC may deliver dummy packets without any real payload: the payload is a field indicating the virtual size of the packet, i.e. the size which will be reflected in the next offset in the normal way (prefix size included). Dummy SYNC PDUs are identified as such by their small actual size (no real packet is so small).

Idle gaps signalled by dummy packets are mapped into RLC PDUs as dummy SDUs, complete with prefix and the padding generated in place of the data according to their virtual size. Resulting PDUs which also include real data are transmitted. PDUs containing only padding need not even be constructed as long as the construction of subsequent PDUs is unaffected.

The padding SDUs are identified as such and discarded by the receiving RLC entity via a padding flag present in each SDU prefix. Note the segment reassembly is not affected (further details in the implementation description below).

The MCE can control the actual eNodeB serving rate with idle gaps, by ensuring a precise pseudo-rate based on the growth of the SYNC byte offset over a scheduling period (or multiples of that).

The invention represents is an improvement of the basic MBMS service content synchronisation scheme known as "byte level sequence number based synchronisation" proposed for LTE (Long Term Evolution). This known scheme mentioned above allows several eNodeBs to transmit packets simultaneously, but it avoids time stamps with each packet and uses instead a byte offset which locates each packet within the virtual byte sequence constituted by successive MBMS service transmit opportunities, which are the same for all eNodeBs involved. As this scheme stands, the possibility of multiple packet loss between the coordinating entity (MCE and one or more eNodeBs requires a constraint on the formation of transmitted blocks of data: each block must transport a fixed amount of user data (including idle gaps as data), user data denoting here payload of the MBMS bearer service. However, the concatenation of packets, which is desirable to avoid capacity waste, generally incurs a variable overhead. So the requirement of a fixed amount of data per block translates to a fixed amount of reserved space in each block, suitable for dealing with a maximum number of concatenations. This could lead to systematic capacity waste.

Advantageous Effects

The invention is described further hereinafter by way of example only with reference to the accompanying drawings.

BEST MODE FOR CARRYING OUT THE INVENTION

It is assumed that the air-interface resources, and associated L1 parameters, allocated for an eMBMS service are fixed, at least throughout a session. Furthermore, it is assumed they are divided into transport blocks of identical capacity. Furthermore, it is assumed that the MAC layer consumes a fixed overhead. The net result of these assumptions being that the RLC in the eNodeB produces RLC PDUs of a fixed, known size per service session, which map to transmit opportunities. However, for clarity, a single size is assumed in the following, although the scheme could be adjusted to predictable variable sizes.

Figure 1:
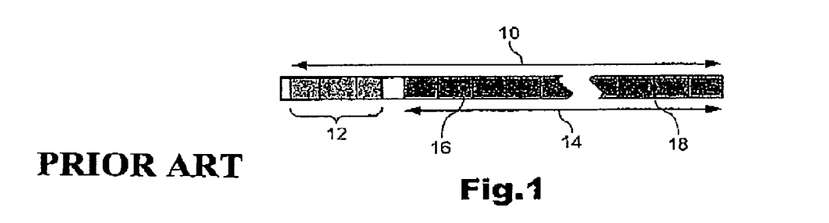
FIG. 1 is an illustration of RLC PDU constructions.

The RLC PDU is composed of a fixed header and a payload portion. The payload defined here will actually include some overhead as well as the data (RLC SDUs or segments thereof), but this way of presenting the RLC process is best suited to the scheme. Whatever the available RLC PDU size and the size required for the header, the payload portion is byte aligned and holds a known integer number of bytes (octets), hereinafter payload size. This is illustrated particularly in FIG. 1 in which an RLC PDU of size 10 having a header portion 12 and a payload portion 14 of a payload size defined by the number of payload bytes 16 separated by said payload bytes 16, i.e. the aforementioned octets, separated by byte boundaries 18.

Figure 2:
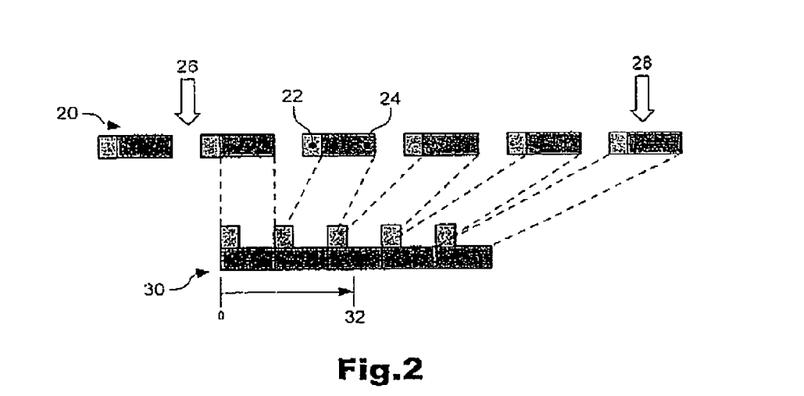
FIG. 2 comprises a virtual representation of payload space.

Considering the sequence of RLC PDUs involved in a service session (from start to finish), the payloads can be seen, conceptually, as forming a continuous stream of bytes or address space, addressable through a byte offset (i.e. starting at zero). That is, a series of RLC PDUs 20 i.e. as illustrated each comprising an RLC header 22 and RLC payload 24 and in which a service session is defined by those PDUs 20 located between the service session start arrow 26 and service session finish arrow 28.

The virtual mapping of the payload space 30 is also indicated along with an example of the byte offset 32 employed in relation to the virtual continuous stream of bytes formed by the payload string 30.

Figure 3:
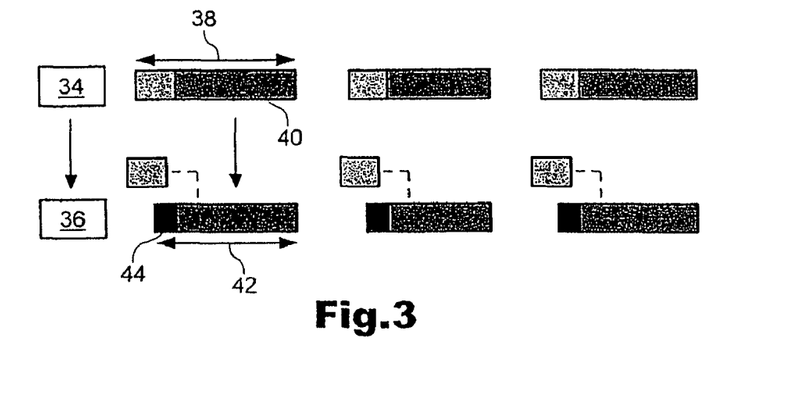
FIG. 3 comprises an illustration of the formation of pre-fixed SDUs by way of the RLC.

Upon delivery of SDUs by the SYNC protocol (SYNC delivers MBMS service packets to eNodeBs which end up as RLC SDUs), the RLC prefixes each SDU with a control element containing (at least) the size of the SDU. Note that this step could be virtual, as only the final arrangement of bytes in an RLC PDU matters. This is illustrated in FIG. 3 wherein the SYNC 34 delivers to the RLC 36 a SYNC PDU 38 comprising an RLC SDU 40 which, at RLC 36 is then formed into an augmented SDU 42 including a prefix 44 arising in accordance with an embodiment of the present invention and which can be added by the RLC 36. However, these prefixes will eventually end up in the payloads of RLC PDUs as real elements, so, in order to preserve octet alignment, the prefixes have an integer number of bytes. This is presented as a virtual association between a length indication in a header and a data element in the payload and leads to the local formation of a new (augmented) SDU from the delivered SDU.

There is a possible alternative, where the length given in the prefix includes that of the prefix itself; in other words, it would be the length of the augmented SDU, rather than merely that of the real SDU. While there might be seen to be little practical advantage to this equivalent method, except that lengths of zero up to the size of the prefix could be given a special meaning. For example, at the end of a session, the final PDU might have to be padded. This could be done in the way suggested below, but an unspecified length of padding with zeros could be specified with a zero length meaning "no more data ever: the session is complete".

Figure 4:
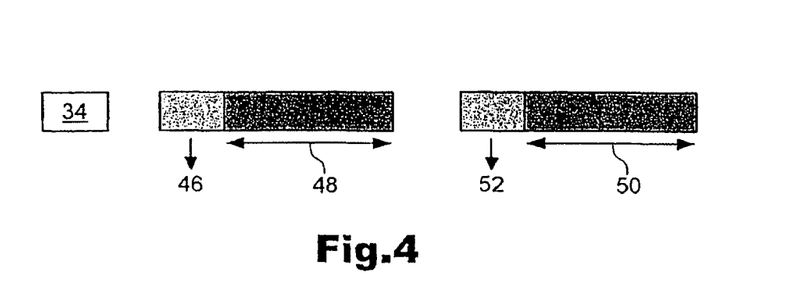
FIG. 4 is an illustration of the SYNC byte offset.

The byte offset carried by SYNC (referring now to the general concept of "byte offset based", or "byte level sequence number based", content synchronisation methods) is the running total of the sizes of the augmented (prefixed) SDUs. The MCE (i.e. the source of the SYNC PDUs) does not need to know precisely about the RLC procedures in the eNodeBs; all it does is exaggerate the sizes of packets by a fixed amount (the RLC SDU prefix size) when computing the byte offsets. In other words, the byte offset of the first SYNC PDU is zero and that of any subsequent PDU (ignoring idle gaps) is the offset of the previous PDU incremented by the real size in bytes of the payload of that previous PDU, plus a fixed number which is imposed by the RLC protocol definition. This is just a minor adaptation of the general "byte offset based content synchronisation" method, which also provides for gaps via larger increments of the offset. This is illustrated in particular in relation to FIG. 4 which again illustrates the PDU rising in the SYNC 34 and comprising a packet or RLC SDU 48 and offset value 46. The PDU is then followed by a subsequent PDU comprising the packet or RLC SDU 50 and offset 52 is also illustrated wherein, on this occasion when the offset is equivalent to the sum of the offset 46 and the packet size 48 of the preceding PDU and also the prefix size and any gap size that arises.

This link between SYNC and RLC protocols (a shared constant), while possibly undesirable in principle, does not represent much of a constraint for example SYNC does not need to know the structure of the prefixes nor their usage; it only needs to know about a fixed number to add in offset computations.

In practice, considering packets which shall be no longer than 1500 bytes (current LTE assumption), the prefix would require two octets (11 bits of length indication and a few flags, as described later).

Figure 5:
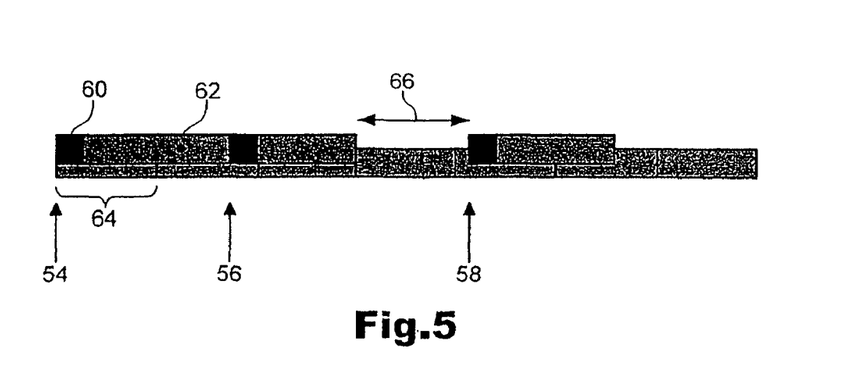
FIG. 5 is a diagram illustrating the placement of prefixed SDUs in the payload space.

The SYNC byte offsets can be seen as addresses in the payload space defined above which allow the RLC to position augmented (prefixed) SDUs absolutely within the payload space and therefore within a specific RLC PDU or across several. The placement of SDUs is therefore independent of any packets lost earlier and this enables each eNodeB to remain synchronized with all other eNodeBs, regardless of any packet losses on the S1 link (between the MCE and eNodeBs). In FIG. 5, there is shown a series of first, second and third packet offsets 54, 56, 58 as compared with a PDU comprising a prefix 60 and RLC SDU 62.

The RLC PDU payload 64 is also illustrated as is a gap 66, which could possibly be filled with a padding SDU (not shown) between the second and third packets. In practice, there is no payload space, but RLC PDU formation can easily be done incrementally: the RLC simply fills the payload portion of the current PDU, following the sequence of augmented (prefixed) SDUs, copying them back to back, along with their prefixes, making sure the byte offsets imply that the SDUs are contiguous, starting where it left off when packing the previous PDU and stopping on whichever byte completes the payload. If a discrepancy in byte offsets implies that SDUs are missing, the RLC simply skips a number of bytes to account for the discrepancy, possibly forwarding the process onto subsequent PDUs. The issue of the contents (value) of the skipped bytes will be revisited later, see below, when considering idle gaps. For now, byte offset discrepancies will be attributed to lost packets. In this case, the skipped bytes are irrelevant as it is anyway necessary to drop any PDU missing any data (i.e. not transmit it): however the skipped bytes might be padded, the resulting transport block would differ from those transmitted by neighbouring eNodeBs which did not incur any packet loss, thus violating MBSFN transmission principles.

The definition above implies that the virtually associated prefixes are now really copied in front of the real SDUs, i.e.

mixed with the data as if part of the payload. In the course of this description, it is the most natural approach. However, in the context of the state of the art on RLC packing, it is common practice to group control elements such as these SDU prefixes and to incorporate them to the RLC header, thus making it of variable size. So the relevance of placing these prefixes inside the payload might be seen as innovative. Moreover, the grouping suggested by prior has an issued here, which can be addressed, as shown below, but with disadvantageous effect. The issue arises with configurations equivalent to the cases where, from the payload space perspective presented here, a prefix needs to be split between two PDUs, or, from, the prior art perspective, for example, RLC PDU construction leads to spare capacity in the PDU which is smaller than a prefix, say just one byte. It is important for synchronisation that the SYNC byte offset matches the sum of data bytes and prefix bytes, that single spare byte cannot simply go to waste (proof: this could happen twice, then the discrepancy is 2 bytes which is enough for a prefix, so if an eNodeB misses certain packets, there is a chance it will miss the need to waste a byte here and there, thus loosing synchronisation with the other eNodeBs). To remedy the situation, it could be arranged to have partial prefixes in the list of prefixes in the RLC header and these would require flags. After all, the method already requires continuation flags to indicate the end of the prefix list. Alternatively, a spare byte could be complemented with a reserved byte in the fixed (main) part of the RLC header. But that reserved byte reduces the capacity of a PDU in the general case. Also, it amounts to creating a byte out of thin air within payload space. So this would have to be compensated by an extra wasted byte in the next PDU in order to keep synchronisation with the SYNC byte offsets. A configuration such as this would also require flags to signal it. All this could be clarified if needed. The claim here is that it is better to place the prefixes within the payload as grouping them in a variable RLC header is cumbersome and less efficient.

Figure 6:
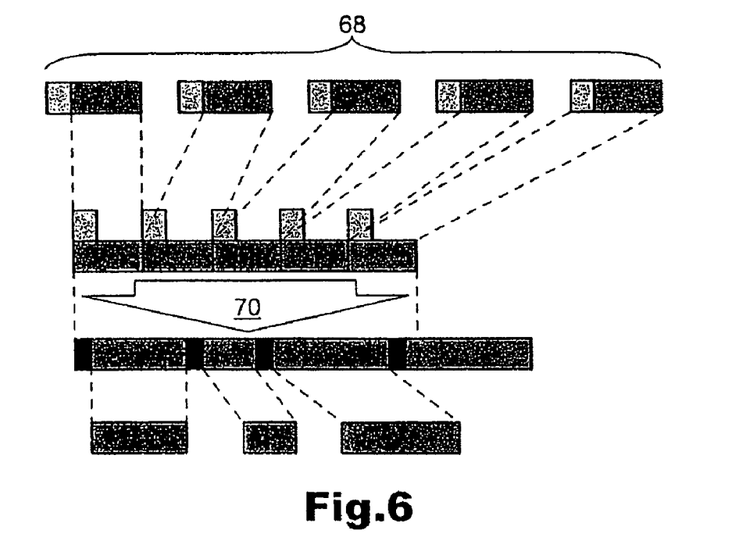
FIG. 6 is a schematic diagram illustrating the unpacking of RLC SDUs by way of a receiving terminal.

RLC PDU unpacking is trivial so long as no PDUs are lost (i.e. not decidable by the lower layers). Then the concept of a continuous payload space still works: the stream of bytes starts with a so-called prefix including the length of the following SDU, which is immediately followed (in payload space) by the next prefix and so on. FIG. 6 serves to illustrate the unpacking of a series of RLC SDUs 68 by way of direct mapping 70 at a receiving terminal. Note that the final PDU may have to be completed with some padding; this way the unpacking RLC will have a prefix indicating what to discard (in the same way it would proceed with idle gaps within the data stream). In practice, the RLC processes PDUs one at a time, which simply means two things:

The RLC remembers the length of an SDU and how much has already been unpacked when it is apparent that it continues beyond the current RLC PDU.

The RLC may find that the space remaining in a PDU payload is too small for a prefix (in the proposed LTE implementation, that would mean that there is only one byte left). Then the RLC must store this remaining PDU portion, assuming it to be the beginning of a prefix to be completed by the start of the next payload.

This latter point, although deriving naturally from the discussion above is an improvement on the prior art consisting in grouping prefixes behind the main header. The latter can be worked out in several ways which are either awkward or end up wasting capacity, as has been rather laboriously detailed above.

In case some RLC PDUs are lost at the unpacking side (corrupted and undecodable by its lower layers for whatever reason, including the effect of lost packets at an eNodeB), it is possible that some prefixes will be missing, which breaks the chain described above. For the purpose of restarting the unpacking process after a missing PDU (any number of PDUs actually), each PDU must include information indicating where to find the next accessible prefix. This information is provided by including a length indication element within the RLC fixed header. Note that the size of the header does not affect synchronisation because of its fixed size, or rather because of the resulting known size of the payload portion. The new field can be seen as the length of the augmented SDU segment which may start the payload portion such as in FIG. 7 wherein a RLC PDU configuration with a payload 72 is illustrated incorporating a prefix offset field value 74 and which is also illustrated separately at 76. But there are different segmentation cases to consider and a more precise definition of this length indication, to be named "prefix offset field", is: The offset of the first start of augmented SDU relative to the beginning of the payload PDU portion, with the following logical limit cases.

Figure 7:
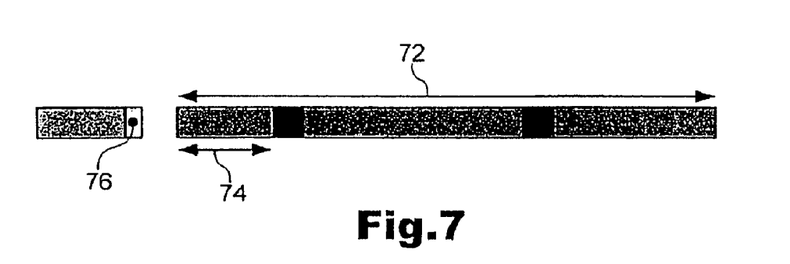
FIG. 7 serves to illustrate a common RLC PDU configuration.
Figure 8:
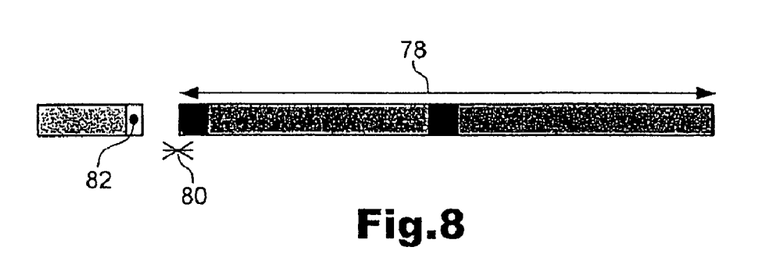
FIG. 8 is an illustration of a configuration similar to that of FIG. 7 but with no ongoing segmentation found at the start of the payload.

If the PDU does not start with ongoing segmentation, it follows logically, that the "prefix offset field" must be set to zero, as shown in FIG. 8, which, as with FIG. 7 illustrates a payload 78, and incorporated prefix offset field 80, as separately represented at 82, but wherein the actual value of the field 80 is zero.

Figure 9:
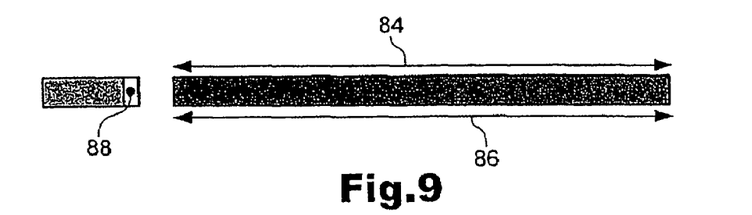
FIG. 9 is a similar illustration of RLC PDU configuration but in mid-segmentation.

If the PDU only holds a segment (i.e. this PD comes in the middle of a long segmented SDU and there is thus no prefix in the payload), then the value of the "prefix offset field" must be at least equal to the length of the payload portion. The alternative to that length being an offset till the next prefix in the continuous payload space defined in (3), but that is really not necessary. See FIG. 9 which comprises an illustration of an example in which the length of payload 84 is equal to the length of the prefix offset field 86—which again is illustrated separately at 88.

Figure 10:
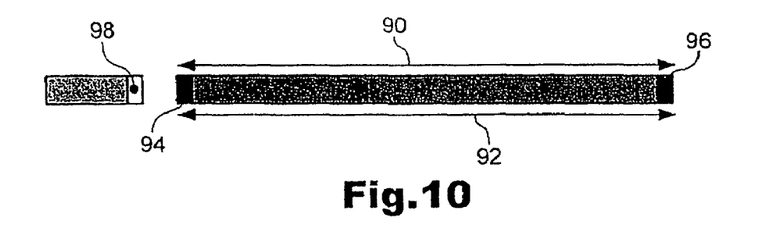
FIG. 10 provides an illustration of RLC PDU configuration in which segmentation has divided two prefixes.

As the definition already implies, if the payload starts with a truncated prefix (because it started in the previous PDU), the correct prefix to point to with the "prefix offset field" is the next one. This is illustrated in FIG. 10 where, in addition, the next prefix happens to be truncated as well. That is, while the length of payload 90 is near equal to the length of the prefix offset field 92 with the exception of divided prefixes 94, 96, and, with the prefix offset field 98 again being illustrated separately at 98.

However, this latter case belongs to a scenario which can be enhanced: Whenever the augmented SDU gets segmented before the start of the SDU, it is possible to recover the SDU (or its initial segment in case it is segmented across the next PDU). With extra flags in the RLC header (or the "prefix offset field" itself, which is anyway part of the header) the following conditions can be indicated: segmentation splits the augmented SDU between its prefix and the SDU; and the last byte of the prefix is present in the current PDU.

It should be noted that there would be more cases should the prefix size be greater than 2.

Figure 11A:
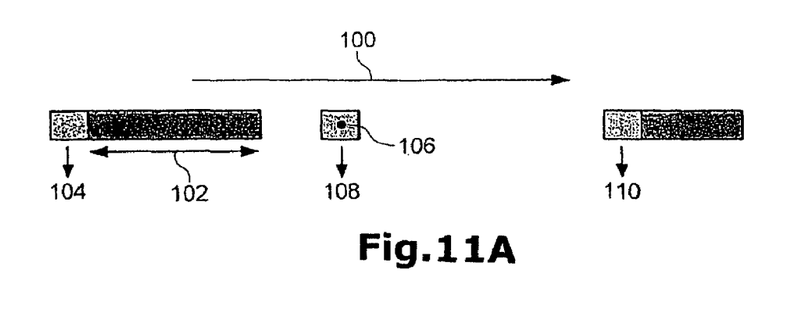
FIGS. 11A and 11B illustrate different scenarios of employment of a dummy SYNC PDU.

The SYNC byte offset mechanism allows idle gaps to be generated at the MCE and seen as lost data from the perspective of the eNodeBs (idle gaps are necessary for rate matching, i.e. flexibility, over a packet routed network and eNodeBs cannot generate synchronised idle gaps by themselves). However, in this instance, the simplicity of a common procedure for idle gaps and lost packets is detrimental. This is because lost packets are assumed to be random events occurring independently at each eNodeB. So when an eNodeB would have a PDU to transmit with missing data, it would most definitely transmit a block which is different from what the neighbouring eNodeBs are transmitting and would violate the rules of MBSFN transmission. Therefore losing packets may also force the effective loss of data correctly received but surrounding the gap (not merely the segments haring a PDU with a gap, but the entire packet these segments belong to). Idle gaps, however are not an abnormal and infrequent case: they occur frequency in normal operation and are common to all MBSFN participating eNodeBs. With idle gap signalling (i.e. a mechanism distinguishing them from lost packets), eNodeBs need not throw away any data around the idle gaps, as any partially filled PDU would then still be the same for every eNodeB. Idle gaps may be signaled without any significant change to the SYNC protocol by using dummy SYNC PDUs which would not carry any user data. The purpose of the dummy SYNC PDU is to positively declare idle gaps to eNodeBs. They must therefore carry the size of the gap they are meant to signal. This would be trivial if those packets were generated with dummy data of the right size. But firstly, this takes up unnecessary capacity, and secondly, the dummy data would have to be distinguished from real data. However, if the data payload of the PDUs were simply omitted while a virtual size was added to the byte offsets, the size of the gap would only be known retrospectively (multiple dummy PDUs would only mitigate this). Moreover, there is still a cancel that part of the gap actually includes one or several lost packets and it is therefore not guaranteed that it is right for the eNodeB to transmit a partially filed PDU. This is explained graphically in FIG. 11A, wherein, against an illustration of time, there is illustrated a PDU comprising a packet or RLC SOU 102 along with prefix offset 104, a subsequent dummy SYNC PDU 106 including an offset 108 equivalent to the sum of the offset 104, and the packet RLC SDU 102 in octets and the local value two and followed by a PDU in which the prefix offset 110 comprises the sum of the offset of the dummy SYNC PDU 106 in addition to the value X.

Figure 11B:
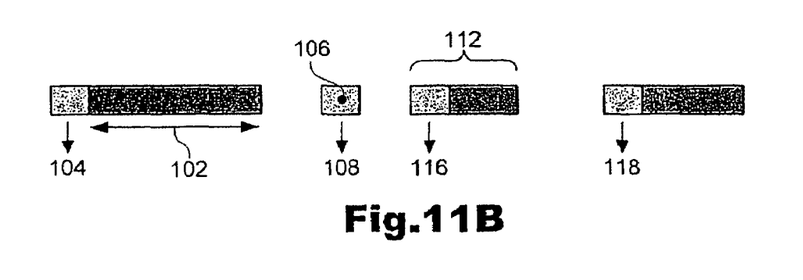

FIG. 11B illustrates an example in which the PDU 102, 104 and a dummy SYNC PDU 106 again arrives but wherein, also, an intervening PDU 112 is considered to be having a packet or RLC SDU 114 and a prefix offset 116 is considered to be lost and subsequently followed by a PDU with a prefix offset value equivalent to the sum of the aforementioned offset 104, packet size equivalent to the aforementioned dummy SYNC PDU 106 the prefix of the dummy SYNC PDU 108 and the aforementioned nominal value X. The proposed structure of the dummy SYNC PDU is the same as the normal PDU but with its payload (what should be the packet or RLC SDU) replaced with a length indicator set to the size the payload should be (the virtual size of the dummy packet). The byte offset is still set as with proper PDUs, except that the offset of any packet following a dummy PDU (whether itself dummy or not) is incremented by the virtual size of the previous packet, not its real size, plus the RLC SDU prefix size (alternatively, the virtual size of the dummy packet is the difference in offsets with the following SYNC PDU, minus the prefix size). The dummy PDUs are distinguished from normal PDUs by their actual size as the size required for a length indicator is smaller than the minimum packet size.

It is of course appreciated that dummy SYNC PDUs can be lost. However, this then only makes eNodeBs revert to the safer option of not transmitting padded PDUs. Loss is acceptable in abnormal situations; lost dummy packets are no different.

As indicated above, idle gaps require a mechanism to pad incomplete RLC PDUs carrying data to be transmitted. Padding is merely a mechanism to guarantee that all eNodeBs produce the same PDUs and it is not required to fill the wholes left behind by the packing method described above (e.g. padding could be moved to the end of the payload). But it will be much simpler to treat idle gaps as dummy SDUs (although dummy SYNC PDUs would not translate transparently to dummy SDUs since those do not carry dummy data whilst padding would be dummy data to be generated and signalled via the padding flag). In addition, this method guarantees that all considerations above remain valid. So, like real SDUs, dummy or padding SDUs follow a prefix indicating the length of the padding, which could be all zeros (or anything else so long as it is standardized). These padding SDUs need to be discarded by the unpacking RLC entities and the value of the padding is not a reliable way to signal them, so as "padding flag" in each prefix indicates whether the related SDU is padding or not. Unpacking is not otherwise affected: padding SDUs may be segmented like any SDU; lost RLC PDUs could mean that the nature of a segment would be undecided (if the matching prefix was missing or incomplete), but it would be discarded anyway like any segment of an incomplete SDU. It is suggested that a padding SDU is created per dummy SYNC PDU. Note that PDUs only carrying padding need not be transmitted nor even constructed.

As mentioned above, it is not necessary for padding to match the logical gap within an RLC PDU. In other words, once SDUs have been segmented and assigned to a PDU, they could be rearranged within the PDU, pushing for instance any gap to one end. However, this introduces issues when the gap is very small the intersection of a gap with a PDU could be as small as a byte), which can be resolved with flags.

The MCE cannot ignore eNodeB-induced overheads entirely as it is preferable that eNodeB queues are never empty (the eNodeBs would have to proceed as with lost packets, but it would be better for the MCE to generate synchronised idle gaps). Fortunately, with this method, the MCE need only ensure a constant serving rate as measured by the SYNC byte offset. So idle gap size computation should really be a function of the offset growth over time, rather than the target average packet data transmit rate (in bytes). In other words, idle gaps should regulate the SYNC byte offset and effectively manage gaps in the RLC payload space rather than relate to the volume of actual packet data. Therefore, in principle, an offset relating to an idle gap could be smaller than a prefix and this would invalidate the suggested technique noted above. Enhancements both at the SYNC layer (negative virtual size of a dummy packet when the following offset must be smaller than the prefix size) and the RLC layer (flag in the SDU prefix indicating that it is longer than normal, i.e. 3 byte prefix instead of an impossible 1 byte gap followed by a normal prefix) could resolve this issue. However, such tiny idle gaps are not realistic and it will be much simpler to require that idle gaps must be longer than a specified minimum size (the same value as already specified for the RLC related SYNC byte offset increment, actually) with the resulting effect that padding SDUs (complete with prefixes) can always be fitted within the specified gaps.

As noted, it is appreciated that the MCE must have some knowledge in order to guarantee that the air-interface service rate is not on average higher than the MCE serving rate. The synchronisation method presented here reduces this knowledge to the requirement on the MCE to serve packets or idle gaps, such that the growth rate of the offset (i.e. not the real user data rate) over the scheduling interval, or multiples of that, is precisely constant (and matching what the physical allocation can support, all other overheads considered).

From the above it will therefore be appreciated that the invention represents an advantageous departure from the current art. In particular the notion of a SDU prefix comprising control information mixed in with the data in the payload.

It is also appreciated that there is a necessity to have a length indicator within the RLC main (fixed) header. This is not an additional instance of an SDU header (prefix), but just a length indication relative to a segment this time, not an SDU. Its precise definition being as specified above and, implicitly, this states that the prefixes do not need any extra fields to support segmentation.

The invention proposes the idea of handling segmentation cases where an augmented SDU is only missing its prefix, or part of it, through a couple of flags in the fixed header (or the prefix offset field).

While not essential the invention recognises the possibility of final padding with zeroes associated with prefixes which include themselves in their length indication.

This could also be used for padding within the session, but I do not like it and prefer the padding flag in the prefix: the padding need not be placed in its logical position in the payload; looking at each RLC PDU, the padding could always be moved to the end of the payload block. In which case, a length of zeros (reading the first bytes as a prefix) could indicate that it is padding, its actual length being implicit from the size of the payload block. Then the padding bit in all prefixes would be redundant. Note however that there would be a problem if the padding assigned to the PDU was only one byte (idle gaps shorter than a prefix will not happen, but their position in payload space is arbitrary and it is definitely wrong to make the MCE pay attention to RCL block boundaries when inserting idle gaps): one byte is too short to make a prefix, let alone a prefix indicating a null length. So yet another flag would be required in the fixed header. Since there are spare bits hi the prefixes anyway, a padding flag per prefix and padding where you would expect it is simpler and better.

INDUSTRIAL APPLICABILITY

Although not limited in this regard, the invention will find particular use in any eNodeB (node B supporting LTE) supporting MBSFN and any LTE UE capable of receiving MBMS (&) and any equipment implementing the LTE Multi-cell Coordination Entity (MCE).

The invention claimed is:

1. A method of forming RLC blocks for content synchronization within a mobile radio communications network, each RLC block including an RLC header and a payload, the method including providing a control element for each of a plurality of SDUs within each payload,
wherein each control element comprises a header element arranged to precede its respective SDU wherein the header element is different from the RLC header.

2. A method as claimed in claim 1, wherein the header element comprises a prefix for each SDU.

3. A method as claimed in claim 1, wherein the header element includes a flag serving to indicate a length of data to which the header element refers.

4. A method as claimed in claim 1, wherein the header element is included with data within the payload.

5. A method as claimed in claim 1, wherein a size of the header element is fixed.

6. A method as claimed in claim 1, wherein the RLC header further includes a length indicator.

7. A method as claimed in claim 1, further including computing idle gaps.

8. A method as claimed in claim 7, the further including signalling idle gaps that employ dummy packets.

9. A method as claimed in claim 8, further including mapping the dummy packets into RLC PDUs as dummy SDUs.

10. A method as claimed in claim 7, wherein a length of said idle gaps are greater than a specified minimum size.

11. A method as claimed in claim 1, wherein a formation of the header element is arranged to employ a final padding with zeros associated with length indicators.

12. A method as claimed in claim 1, wherein a payload includes a prefix offset field.

13. A method as claimed in claim 12, wherein a length of a payload is equal to a length of the prefix offset field.

14. A mobile radio communications network device for providing RLC blocks for content synchronization within a mobile radio communications network, each RLC block including RLC header and a payload, the device being arranged for providing a control element for each of a plurality of SUDs within each payload, the device being arranged such that each control element comprises a header element arranged to precede its respective SDU wherein the header element is different from the RLC header.

15. A mobile radio communications network device as claimed in claim 14, further comprising a multi-cell coordinating entity.

* * * * *